United States Patent [19]
Smith et al.

[11] Patent Number: 4,882,465
[45] Date of Patent: Nov. 21, 1989

[54] ARCJET THRUSTER WITH IMPROVED ARC ATTACHMENT FOR ENHANCEMENT OF EFFICIENCY

[75] Inventors: William W. Smith; Steven C. Knowles, both of Seattle, Wash.

[73] Assignee: Olin Corporation, Stamford, Conn.

[21] Appl. No.: 103,471

[22] Filed: Oct. 1, 1987

[51] Int. Cl.⁴ .............................................. B23K 9/00
[52] U.S. Cl. ........................... 219/121.48; 219/121.5; 219/121.51; 219/121.52; 219/121.36; 60/203.1; 315/111.21
[58] Field of Search ...... 219/121 PM, 121 P, 121 PR, 219/121 PQ, 121 PP, 75; 313/231.31, 231.41, 231.51; 315/111.21, 111.41, 111.81, 111.61; 60/203.1

[56] References Cited
U.S. PATENT DOCUMENTS

| | | | |
|---|---|---|---|
| 3,297,899 | 1/1967 | Pratt et al. | 219/121 PP |
| 3,309,873 | 3/1967 | Cann | 219/121 PP |
| 3,360,988 | 1/1968 | Stine et al. | 219/121 PR |
| 3,447,322 | 6/1969 | Mastrup | 219/121 PP |
| 4,620,080 | 10/1986 | Arata et al. | 219/121 PR |
| 4,638,488 | 1/1987 | Shimomoto | 219/121 PR |
| 4,661,682 | 4/1987 | Gruner et al. | 219/121 PR |

Primary Examiner—M. H. Paschall
Attorney, Agent, or Firm—Bruce E. Burdick

[57] ABSTRACT

An arcjet thruster has a constrictor and nozzle defining an arc chamber. The constrictor has an insulator and an anode. The constrictor defines a subsonic-to-supersonic transition zone axially coextensive with the inculator and anode. The anode is disposed side-by-side with the insulator and located upstream therefrom. A rod defines a cathode spaced from the anode by a gap. An electrical potential is applied to the anode and cathode to generate an electrical arc in the chamber which produces thermal heating of propellant gases flowing through the chamber and expansion thereof through the nozzle. Location of the insulator downstream from the anode causes diffusion and attachment of the arc to occur at the region of the anode in the constrictor and prevents movement of the arc diffusion and attachment region downstream past the insulator to the nozzle in response to propellant gas mass flow variations through the constrictor. The thruster can also include an expansion and compression cavity in the arc chamber to provide a low pressure region at the anode for arc attachment and diffusion. Further, a zone of thermal and mechanical isolation can be provided between the anode and insulator to reduce the temperature at the insulator and displace its location farther away from the region of arc attachment and diffusion at the anode. Still further, a passage is defined through the insulator to provide a path for secondary flow of propellant gas into the chamber downstream of the arc attachment and diffusion region in order to reclaim frozen flow losses.

14 Claims, 2 Drawing Sheets

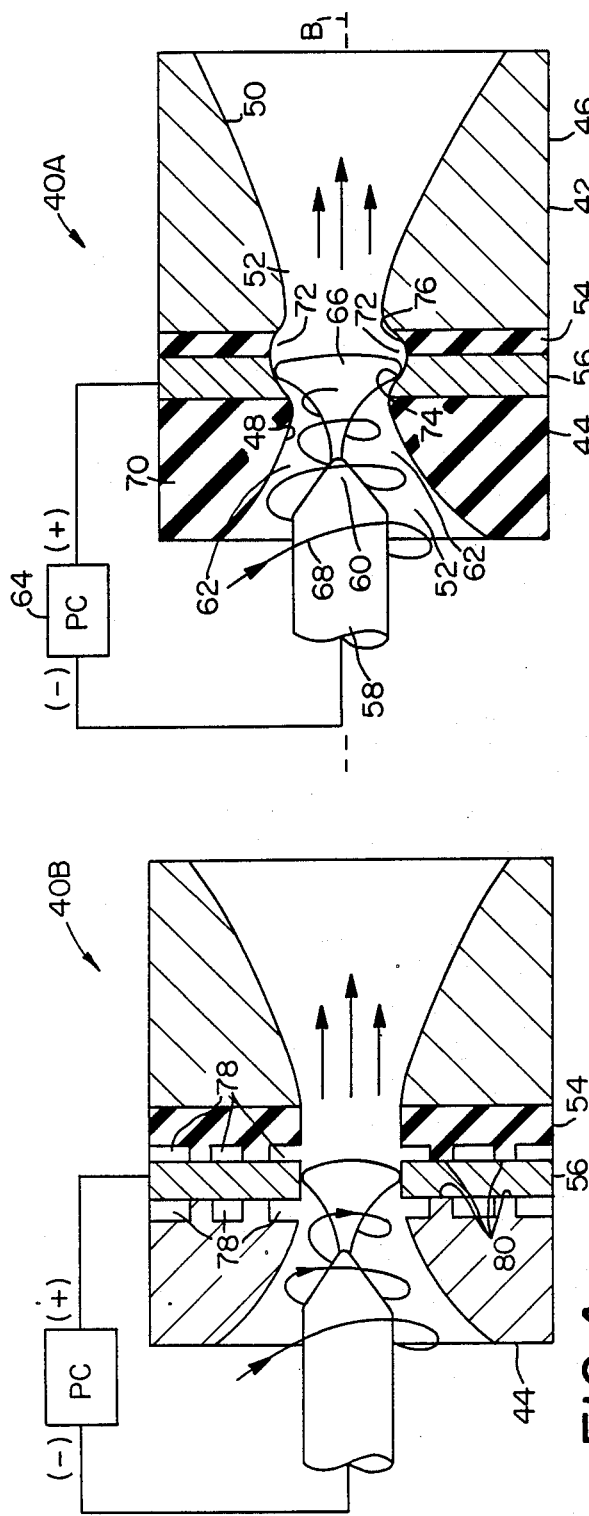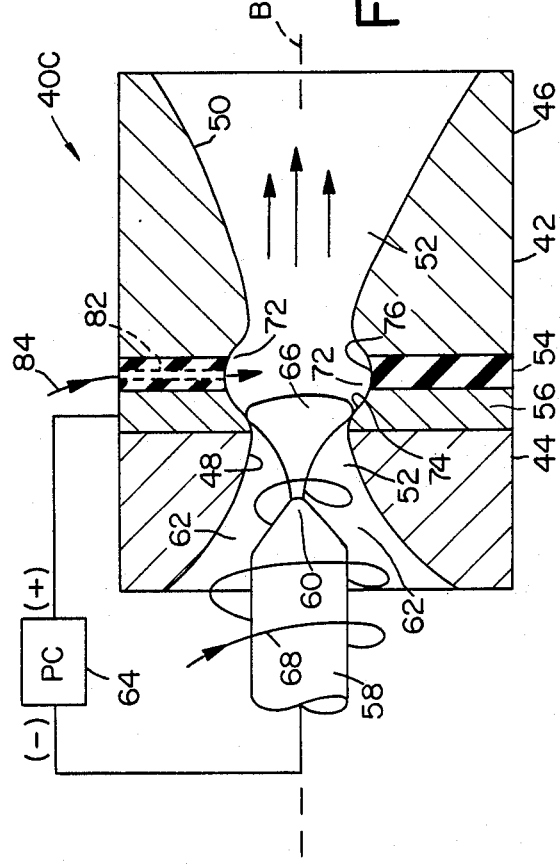

ARCJET THRUSTER WITH IMPROVED ARC ATTACHMENT FOR ENHANCEMENT OF EFFICIENCY

CROSS REFERENCE TO RELATED APPLICATION

Reference is hereby made to the following copending U.S. Pat. application dealing with related subject matter and assigned to the assignee of the present invention: "Improved Efficiency Arcjet Thruster Controlled Arc Startup and Steady State Attachment" by Steven Knowles and William W. Smith, assigned U.S. Ser. No. 889,451 now U.S. Pat. No. 4,800,716 and filed July 23, 1986.

BACKGROUND OF THE INVENTION

1. Field of the Invention

The present invention generally relates to small propulsion systems for maneuvering spacecraft and, more particularly, is concerned with an electrothermal arcjet thruster employing any one of several different features for improving arc attachment and thereby achieving enhanced efficiency.

2. Description of the Prior Art

As conventionally known, an electrothermal arcjet thruster converts electrical energy to thermal energy by heat transfer from an arc discharge to a flowing propellant and from thermalenergy to directed kinetic energy by expansion of the heated propellant through a nozzle. For an explanation from an historical perspective of arcjet thruster construction and operation and the problems associated with this type of electrothermal propulsion, attention is directed to the following publications: "Arcjet Thruster for Space Propulsion" by L. E.. Wallner and J. Czika, Jr., NASA Tech Note D-2868, June 1965; "The Arc H Engine" by F. G.. Penzig, AD 671501, Holloman Air Force Base, March 1966; and "Physics of Electric Propulsion" by R. G.. Jahn, McGraw-Hill Book Company, 1968. Attention is also directed to U.S. Pat. No. 4,548,033 to G. L.. Cann.

· Most electrothermal arcjet thrusters have as common features an anode in the form of a nozzle body and a cathode in the form of a cylindrical rod with a conical tip. The nozzle body has an arc chamber defined by a constrictor in a rearward portion of the body and a nozzle in a forward portion thereof. The cathode rod is aligned on the longitudinal axis of the nozzle body with its conical tip extending into the upstream end of the arc chamber in spaced relation to the constrictor so as to defined a gap therebetween.

Electrothermal arcjet thrusters currently being developed are limited in their efficiency principally by a loss mechanism called frozen flow losses. Frozen flow losses include ionization, disassociation, and deposition of energy into excited molecular states. Frozen flow losses occur when the propellant gas is heated to very high temperatures by close contact with an electric arc and then exhausted out a nozzle. In standard arcjet thrusters, insufficient time in high pressure regions is allowed to recombine the ions or disassociated molecules or to relax the excited states. Energy locked into these processes is, therefore, lost and unavailable for thrust. In addition to the frozen flow losses in the standard constricted arc geometry, standard constricted arcjets are not tolerant to large fluctuations in mass flow because the arc is "blown" into regions where heat transfer and the conversion of thermal energy into kinetic energy is inefficient.

Consequently, a need exists for a fresh approach to improvement of arc attachment in an arcjet thruster in a way which will enhance the efficiency thereof.

SUMMARY OF THE INVENTION

The present invention provides an improved efficiency arcjet thruster designed to satisfy the aforementioned needs. The present invention encompasses several different features, unknown in the prior art, which substantially ameliorate the problems encountered heretofore with control of the arc attachment region in standard arcjet thrusters and have promise for making an arcjet thruster an economical and reliable propulsion system for maneuvering spacecraft. Most of the features are advantageously incorporated together in the same arcjet thruster to realize significantly improved efficiency and optimized performance, although in certain instances the advantages to be derived from some of the features can be enjoyed separately from the others in different thrusters.

Basically, the features provide enhancement of arcjet thruster efficiency and flexibility by controlling the location of the arc attachment zone through proper use of insulation and by allowing conditions downstream of this zone to create recombination and relaxation of frozen flow losses. One feature relates to the use of electrical insulation techniques to force arc attachment prior to or upstream of the expansion nozzle in a constricted arc geometry. Another feature relates to the use of a diverging/converging section in combination with arc attachment control in a constricted arc geometry. Still another feature relates to the use of a thermally and mechanically insulative space (without material) in combination with either of the above two features which achieves close proximity of the insulative and arc attachment regions without insulation erosion. A final feature relates to the use of secondary propellant injection in combination with any one of the above three features to enhance efficiency by reclaiming frozen flow losses.

Accordingly, the present invention is directed to an arcjet thruster, comprising the combination of: (a) means forming an annular-shaped constrictor and an annular-shaped nozzle being tandemly-arranged and having respective interior surfaces which together define an arc chamber the constrictor defining a subsonic-to-supersonic transition zone axially coextensive with its interior surface; (b) a first annular-shaped portion of the constrictor being electrically insulative to define an insulator; (c) a second annular-shaped portion of the constrictor being electrically conductive to define an anode being disposed side-by-side with the insulator and located upstream therefrom the insulator and anode being axially coextensive and disposed along the transition zone defined by the constrictor; (d) an elongated member having a tip disposed adjacent to an upstream from the constrictor anode, the member being electrically conductive to define a cathode spaced from the anode by a gap generally coextensive with the arc chamber; and (e) means for applying an electrical potential to the anode and cathode so as to generate an electrical arc in the arc chamber from the cathode to the anode which produces thermal heating of propellant gases flowing through the transition zone of the constrictor and expansion thereof through the nozzle, the disposition of the insulator downstream from the anode causing diffusion and attachment of the electrical arc to occur at the region or the anode in the transition zone of the constrictor and preventing movement of the arc diffusion and attachment region downstream past the insulator to the nozzle in response to propellant gas mass flow variations through the constrictor. Also, the thruster can have a third annular-shaped portion of the constrictor being electrically insulative to define another insulator which is disposed side-by-side with the anode, upstream therefrom, and closer to the cathode than is the anode.

Further, the arcjet thruster can include an expansion and compression cavity formed in the chamber by diverging and converging side-by-side constrictor surface portions defined on the correspondingly side-by-side disposed anode and insulator. The expansion and compression cavity provides a low pressure region at the anode for arc attachment and diffusion. Still further, the thruster can include means on the constrictor defining a zone of thermal and mechanical isolation between the anode and insulator which provides a stagnant gas region and a mechanical interface at the zone which correspondingly reduces the temperature at the insulator and displaces its location farther away from the region of arc attachment and diffusion at the anode. Also, the thruster can include means defining a passage through the insulator to the arc chamber for providing a path for secondary flow of propellant gas into the chamber downstream of the region of arc attachment and diffusion in order to reclaim frozen flow losses.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is a schematical axial sectional view of a second embodiment of the cathode rod and anode nozzle body of the arcjet thruster constructed in accordance with the present invention.

FIG. 4 is a schematical axial sectional view of a third embodiment of the cathode rod and anode nozzle body of the arcjet thruster constructed in accordance with the present invention.

FIG. 5 is a schematical axial sectional view of a fourth embodiment of the cathode rod and anode nozzle body of the arcjet thruster constructed in accordance with the present invention.

DETAILED DESCRIPTION OF THE INVENTION

Figure 1:
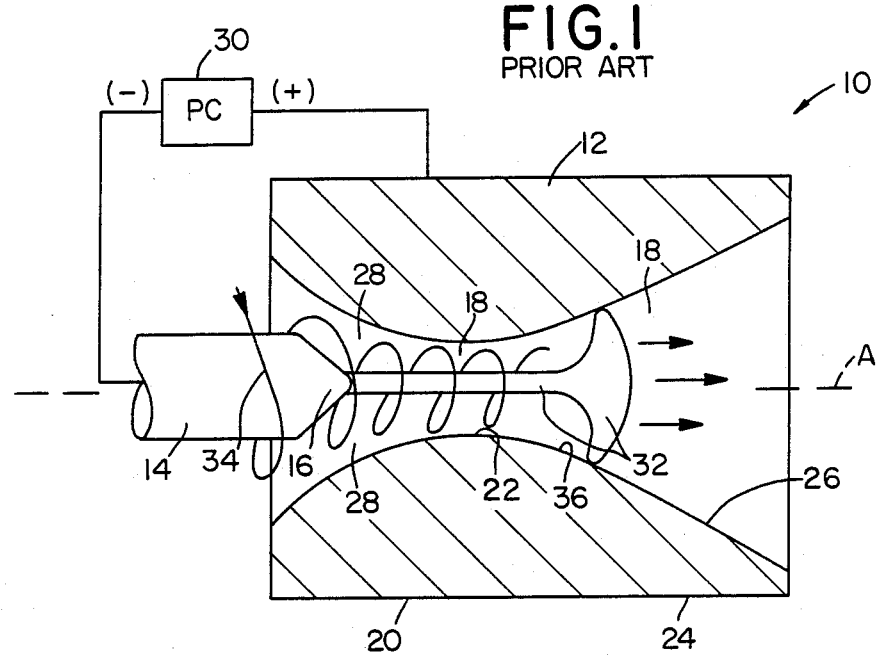
FIG. 1 is a schematical axial sectional view of the cathode rod and anode nozzle body of a standard prior art arcjet thruster.

In the following description, like reference characters designate like or corresponding parts throughout the several views of the drawings.

Standard Arcjet Thruster of the Prior Art

Referring now to the drawings, and particularly to FIG. 1, there is shown in schematical fragmentary form a standard constricted arc geometry electrothermal arcjet thruster of the prior art, generally indicated by the numeral 10. As conventionally known, the arcjet thruster 10 basically includes an anode 12 in the form of a cylindrical body composed of electrically-conductive metal and a cathode 14 in the form of an elongated cylindrical rod composed of electrically-conductive metal with a conical tip 16. The anode body 12 has an arc c chamber 18 defined by a constrictor 20 in the form of a cylindrical interior surface 22 in a rearward portion of the body and a nozzle 24 in the form of a conical interior surface 26 in a forward portion thereof. The constrictor 20 defines a sunsonic-to-supersonic transition zone in the arcjet thruster 10 axially coextensive with its interior surface 22. The cathode rod 14 is aligned on the longitudinal axis A of the anode body 12 with its tip 16 extending into the upstream end of the arc chamber 18 in spaced relation to the constrictor 20 so as to defined a gap 28 therebetween.

A power controller 30 is electrically connected between the anode body 12 and the cathode rod 14 and is operable in a known manner for establishing an electrical potential therebetween, being positive at the anode body 12 and negative at the cathode rod 14, to initiate generation of an arc 32 across the gap 28. The power controller 30 is represented in block form since its components are well known in the art, and to reproduce them in detail would only serve to increase the complexity of the explanation of the arcjet thruster 10 without adding to its clarity.

The arc 32 is first initiated between the tip 16 of the cathode rod 14 and the anode body 12 at the entrance to the constrictor 20. The arc 32 is then forced downstream along the surface 22 of the constrictor 20 by pressurized vortex-like flow of a propellant gas, as represented by the arrow 34, through and past the subsonic-to-supersonic transition zone of the gap 28, through the constrictor 20 and out the nozzle 24 of the thruster 10. The arc 32 stabilizes at the surface 26 of the nozzle 24 of the anode body 12.

In the above-described standard constricted arc geometry arcjet thruster 10, the electric arc 32 is "constricted" by the parallel electrode geometry of the constrictor cylindrical surface 22 and by the radial gas dynamic forces of the induced vortex generated by tangential injection of the propellant. The propellant gas is heated in the region of the constrictor 20 and in the region of arc diffusion at the mouth 36 of the nozzle 22 downstream of the exit from the constrictor. This superheated gas is then exhausted out the nozzle 22 to achieve thrust. The electrical circuit of the arcjet thruster 10 is completed between the cathode rod 14 and anode body 12 with arc attachment occurring in the region of the nozzle mouth 36. The location of arc attachment in the anode body 12 is determined by the mass flow rate, which "pushes" the arc diffusion region down the nozzle 22, and by the availability of an electrically conductive region, i.e. the anode body, for arc attachment.

Shortcoming of Standard Arcjet Thruster

Recent testing of an arcjet thruster having the above described standard configuration has uncovered two important facets of arcjet performance. In these tests, it was found that the arc diffusion region contributed a large fraction of the heat transfer to the propellant gas. Heat transfer in the region of the constrictor 20 was studied parametrically by varying the length of the constrictor. The performance recorded indicated that even if the length was reduced to zero, the thruster performed substantially the same. This first important discovery of this testing was the critical importance of the arc attachment region as a primary heat transfer zone. The second important discovery of this testing was that as the mass flow rate was varied, the efficiency of the thruster changed substantially. Mass flow variations of 10-15% resulted in up to 25% changes in the overall efficiency. As previously discussed, the mass flow variations change the location of the arc diffusion region and the arc attachment zone.

Large fluctuations in efficiency as the mass flow is varied are unacceptable because spacecrafts use a "blowdown" method of supplying propellant in which the propellant tank feed pressure, and hence the mass flow rate, can drop as much as a factor of 2 from the initial firing to the end of a mission. Control of the arc attachment zone under varying conditions of mass flow is, therefore, very important for the eventual use of this arcjet thruster in a "blowdown" propellant feed system.

From prior analysis and testing, it has been determined that large swings in thruster efficiency could be related to changes in both the amount of energy deposited in the anode from arc attachment and the amount of energy lost to frozen flow losses. To minimize frozen flow losses, additional residence time prior to expansion in the nozzle, was found to be an advantage. This is particularly effective if the additional residence time was spent substantial mixing and resultant melting of the anode. The features of the present invention which will now be described relate directly to achieving this objective and to minimizing the movement of the arc attachment region with varying mass flow, the shortcoming of the standard arcjet thruster 10 described above.

Electrically-Insulative Anode Body Section

Figure 2:
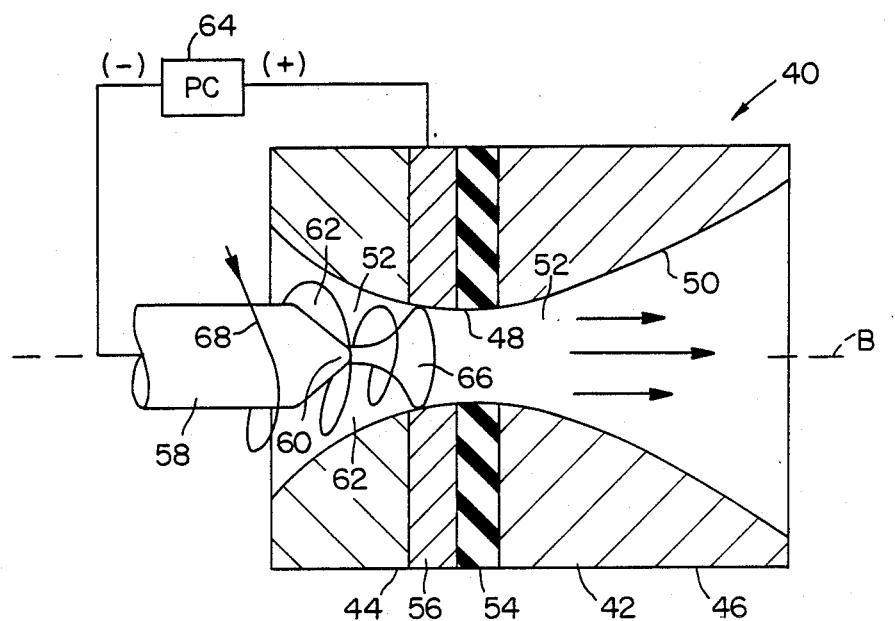
FIG. 2 is a schematical axial sectional view of a first embodiment of the cathode rod and anode nozzle body of an improved efficiency arcjet thruster constructed in accordance with the present invention.

FIG. 2 illustrates a first embodiment of an improved efficiency arcjet thruster 40 constructed in accordance with the present invention. The first embodiment illustrates the use of electrical insulation techniques to force arc attachment and diffusion prior to the expansion nozzle of the thruster in a constricted arc geometry.

Basically, the arcjet thruster 40 includes a cylindrical body 42 forming an annular-shaped constrictor 44 and an annular-shaped nozzle 46 being tandemly-arranged in rearward and forward portions of the body 42 and having respective cylindrical and conical interior surfaces 48, 50 which together define an arc chamber 52. The constrictor 44 defines a subsonic-to-supersonic transition zone in the arcjet thruster 40 axially coextensive with its interior surface 48. A first annular-shaped portion 54 of the constrictor 44 is an insulator formed of electrically insulative material. For instance, the material of the insulator 54 can be boron nitride, alumina, quartz or any suitable high temperature insulation. A second annular-shaped portion 56 of the constrictor 44 is an anode formed of an electrically conductive metal. For instance, the metal of the anode 56 can be tungsten. The anode 56 is disposed side-by-side with the insulator 54 and located upstream therefrom. Also, the tandemly-disposed insulator 54 and anode 56 are axially coextensive with and disposed along the transition zone defined by the constrictor.

The thruster 40 further in member in the form of a cylindrical rod 58 having a conical tip 60 disposed adjacent to and spaced upstream from the constrictor 44. The rod 58 is composed of an electrically conductive metal, such as tungsten, and defines a cathode spaced from the anode 56 by a gap 62 generally coextensive with the arc chamber 52. More particularly, the cathode 58 is aligned on the longitudinal axis B of the body 42 with its tip 60 extending into the upstream end of the arc chamber 52.

A power controller 64 is electrically connected between the anode 56 and the cathode 58 and is operable in a known manner for establishing an electrical potential therebetween, being positive at the annular anode and negative at the cathode, to initiate generation of an electrical arc 66 across the gap 62. The power controller 64 is per se identical to the one used with the standard prior art thruster 10, and so it too is represented in block form since its components are well known in the art, and to reproduce them in detail would only serve to increase the complexity of the explanation of the arcjet thruster 40 without adding to its clarity.

As heretofore, the arc 66 generated in the chamber 52 produces thermal heating of propellant gases flowing through the chamber, as represented by arrow 68, and expansion thereof through the thruster nozzle 46, However, now in the case of the improved efficiency thruster 40, the disposition of the insulator 54 downstream from the anode 56 causes diffusion and attachment of the electrical arc 66 to occur at the region of the anode 56 and thus within the transition zone of the constrictor 44, as depicted in FIG. 2, and prevents movement of the arc diffusion and attachment region downstream past the insulator 54 to the nozzle 46 in response to propellant gas mass flow variations through the constrictor 44.

The above-described use of electrical insulation in the constrictor 44 achieves arc attachment control and enhances relaxation of frozen flow losses. The electric arc 66 is constrained from being blown down the constrictor 44 by the presence of the insulator 54 therein and by isolating the nozzle 46 from the current return path through the anode 56 placed upstream of the insulator 54.

Additional insulation can also be utilized to achieve the desired attachment location by not allowing current to flow upstream of the attachment region of the anode 56. Use of such additional insulation is shown in FIG. 3 wherein a third annular shaped electrically insulative portion of the constrictor 44 defines another insulator 70 which is disposed side-by-side with the anode 56, upstream therefrom and upstream from the transition zone, and closer to the cathode 58 than is the anode. The upstream 70 is not required to achieve the desired effect at all mass flows and power levels. As an example, at current levels below 12-15 amps non-erosive starts have been achieved even if all of the body 42 located upstream of the anode 56 is made of the same electrically conductive material as the anode. At 25 amps and higher currents, it is difficult to rely solely on rapid gas dynamic induced movement of the arc column in the region of the body 42 upstream of the anode 56 to prevent erosion. Hence, at higher current levels the upstream body portion should be in the form of the insulator 70 in FIG. 3. However, it is not required that the nozzle 46 be made of electrically insulative material.

It can be any suitable high temperature insulator, or any high temperature metal such as tungsten or rhenium as long as no return current path is provided.

Heat transfer from the arc 66 to the flowing gas occurs principally in the arc diffusion and attachment region at the anode 56. If this region does not allow arc diffusion due to the high pressure in the constrictor 44, then the propellant vortex will rotate and diffuse the arc preventing local melting of anode region. Relaxation of the energy modes, inherent to prevention of frozen flow losses, occurs in the region of the insulator 54 immediately downstream of the anode 56. The length and diameter of insulator region would vary for different power levels and mass flow. Expansion of the superheated propellant to obtain thrust then occurs in the nozzle 46.

Diverging/Converging Anode Body Section

FIG. 3 illustrates a second embodiment of the improved efficiency arcjet thruster, designated as 40A, constructed in accordance with the principles of the present invention and having the same construction as the first embodiment in FIG. 2 except for the following added feature. The second embodiment illustrates the use of an expansion and compression cavity 72 formed in the arc chamber 52 by diverging and converging side-by-side constrictor surface portions 74,76 defined on the correspondingly side-by-side disposed anode 56 and insulator 54. The expansion and compression cavity 72 provides a low pressure region at the anode 56 for arc attachment and diffusion. Thus, the cavity 72 allows the achievement of the joint objectives of arc attachment control and lower pressure anode attachment. All insulative and electrically isolated regions can be the same as in the thruster 40 of FIG. 2. The surface geometry of the constrictor 44 is changed to allow a lower pressure arc diffusion and attachment region at the anode 56. By controlling the pressure and using the geometry changes as shown, lower erosion to the region of the constrictor 44 upstream of the anode 56 (when it is conductive or a potential current return path) can be obtained.

Thermally/Mechanically Insulative Space/Interfacee in Anode Body

FIG. 4 illustrates a third embodiment of the improved efficiency arcjet thruster, designated as 40B, constructed in accordance with the principles of the present invention and having the same construction as the first embodiment in FIG. 2 except for the following added feature. The third embodiment illustrates the use of means on the constrictor 44 defining a zone of thermal and mechanical isolation between the anode 56 and insulator 54. More specifically, the zone provides an inner stagnant gas region 78 and an outer mechanical interface 80 which correspondingly reduces the heating of the insulator 54 by anode 56 and displaces its location farther away from the region of arc attachment and diffusion at the anode 56. This feature can be used in combination with the feature of FIG. 2 (as shown in FIG. 4) or with the features of both FIGS. 2 and 3.

Generally speaking, electrical isolation between two conductors or thermal and mechanical isolation between a conductor and an insulator can be achieved by maintaining a sufficient gap between these surfaces by controlled spacing. If the two materials are at very high temperatures and one of the materials is less temperature capable than the other material, then physical isolation can be critical to the prevention of sublimation of the lower temperature material. In FIGS. 2 and 3, the material of the insulator 54 is placed in contact with the material of the anode 56 defining the return current path. Tests and analysis has shown that under certain conditions the conductive local anode attachment region can reach temperatures which exceed the stable temperatures of electrical insulation materials. Whereas successful tests of direct insulation/conductor interfaces have been made at power levels up to 2 kW, in tests ranging over 10-30 kW significant erosion of the insulator material did occur.

FIG. 4 depicts the use of stagnant gas chamber or regions 78 to achieve mechanical and thermal isolation of the arc attachment region at the anode 56 from the electrical insulator 54. The reduced area mechanical interface 80 between the anode and insulator materials is moved away from the local region of arc attachment, and thermal conduction to the insulator 54 from the current return electrode or anode 56 is minimized. The stagnant gas regions 78 do not affect the bulk propellant flow substantially if these regions are made small enough. The stagnant gas regions 78 use cooler gas near the surface portion 75 therefore stagnation temperature of the gas is far lower than that of the anode 56.

Secondary Propellant Injection Downstream of Arc Attachment

FIG. 5 illustrates a fourth embodiment of the improved efficiency arcjet thruster, designated as 40C, constructed in accordance with the principles of the present invention and having the same construction as the second embodiment in FIG. 3 except for the following added feature. The fourth embodiment illustrates the use of a passage 82 defined through the insulator 54 to the arc chamber 52 for providing a path for secondary flow of propellant gas, as represented by arrow 84, into the chamber 52 downstream of the region of arc attachment and diffusion at the anode 56 in order to reclaim frozen flow losses. This feature can be used in combination with the feature of FIG. 2 or with the features of both FIGS. 2 and 3 (as shown in FIG. 5) with or without the feature of FIG. 4.

Generally speaking, frozen flow losses can be substantially minimized by enhanced recombination and relaxation events between molecules. The frequency of these events is higher in regions of higher pressure and lower temperature. Both of these conditions can be achieved by injection of a small quantity of the propellant gas which has not been in close contact with the electric arc 66. FIG. 5 depicts the use of secondary injection as a part of the low pressure attachment control The primary propellant injection 68 is heated by contact with the arc 66 in the arc diffusion region. A fraction of the propellant flow prior to primary propellant injection is diverted by suitable means (not shown) to the secondary feed passage 82 (or passages) contained in the insulator 54. This lower temperature flow enters the pre-expansion region of the arc chamber 52 just upstream of the nozzle 46, creating enhanced recombination and relaxation events. Alternatively, secondary injection in this manner can be used in gap isolation of the third feature of FIG. 4 by having the gap space be a plenum for secondary injection.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In an arcjet thruster, the combination comprising:
   (a) means forming an annular-shaped constrictor and an annular-shaped nozzle being tandemly-arranged and having respective interior surfaces which together define an arc chamber, said constrictor defining a subsonic-to-supersonic transition zone axially coextensive with its interior surfaces;
   (b) a first annular-shaped portion of said constrictor being electrically insulative to define an insulator;
   (c) a second annular-shaped portion of said constrictor being electrically conductive to define an anode being disposed side-by-side with said insulator and located upstream therefrom, said insulator and anode being axially coextensive with and disposed along said transition zone defined by said constrictor;
   (d) an elongated member having a tip disposed adjacent to and spaced upstream from said constrictor anode, said member being electrically conductive to define a cathode spaced from said anode by a gap generally coextensive with said arc chamber; and
   (e) means for applying an electrical potential to said anode and cathode so as to generate an electrical arc in said arc chamber from said cathode to said anode which produces thermal heating of propellant gases flowing through said transition zone of said constrictor and expansion thereof through said nozzle, the disposition of said insulator downstream from said anode causing diffusion and attachment of said electrical arc to occur at the region of said anode in said transition zone of said constrictor and preventing movement of said arc diffusion and attachment region downstream past said insulator to said nozzle in response to propellant gas mass flow variations through said constrictor.

2. The arcjet thruster as recited in claim 1, further comprising:
   a third annular-shaped portion of said constrictor being electrically insulative to define another insulator which is disposed side-by-side with said anode, upstream therefrom, and closer to said cathode than is said anode.

3. The arcjet thruster as recited in claim 1, further comprising:
   an expansion and compression cavity formed in said chamber by diverging and converging side-by-side constrictor surface portions defined on said correspondingly side-by-side disposed anode and insulator, said expansion and compression cavity providing a low pressure region at said anode for arc attachment and diffusion.

4. The arcjet thruster as recited in claim 3, further comprising:
   means on said constrictor defining a zone of thermal and mechanical isolation between said anode and insulator which provides a stagnant gas region and a mechanical interface at said zone which correspondingly reduces the temperature at said insulator and displaces its location farther away from the region of arc attachment and diffusion at said anode.

5. The arcjet thruster as recited in claim 4, further comprising:
   means defining a passage through said insulator to said arc chamber for providing a path for secondary flow of propellant gas into said chamber downstream of the region of arc attachment and diffusion in order to reclaim frozen flow losses.

6. The arcjet thruster as recited in claim 3, further comprising:
   a third annular-shaped portion of said constrictor being electrically insulative to define another insulator which is disposed side-by-side with said anode, upstream therefrom, and closer to said cathode than is said anode.

7. The arcjet thruster as recited in claim 6, further comprising:
   means on said constrictor defining a zone of thermal and mechanical isolation between said anode and insulator which provides a stagnant gas region and a mechanical interface at said zone which correspondingly reduces the temperature at said insulator and displaces its location farther away from the region of arc attachment and diffusion at said anode.

8. The arcjet thruster as recited in claim 6, further comprising:
   means defining a passage through said insulator to said arc chamber for providing a path for secondary flow of propellant gas into said chamber downstream of the region of arc attachment and diffusion in order to reclaim frozen flow losses.

9. The arcjet thruster as recited in claim 3, further comprising:
   means defining a passage through said insulator to said arc chamber for providing a path for secondary flow of propellant gas into said chamber downstream of the region of arc attachment and diffusion in order to reclaim frozen flow losses.

10. The arcjet thruster as recited in claim 1, further comprising:
    means on said constrictor defining a zone of thermal and mechanical isolation between said anode and insulator which provides a stagnant gas region and a mechanical interface at said zone which correspondingly reduces the temperature at said insulator and displaces its location farther away from the region of arc attachment and diffusion at said anode.

11. The arcjet thruster as recited in claim 10, further comprising:
    means defining a passage through said insulator to said arc chamber for providing a path for secondary flow of propellant gas into said chamber downstream of the region of arc attachment and diffusion in order to reclaim frozen flow losses.

12. The arcjet thruster as recited in claim 10, further comprising:
    a third annular-shaped portion of said constrictor being electrically insulative to define another insulator which is disposed side-by-side with said anode, upstream therefrom, and closer to said cathode than is said anode.

13. The arcjet thruster as recited in claim 1, further comprising:
    means defining a passage through said insulator to said arc chamber for providing a path for secondary flow of propellant gas into said chamber downstream of the region of arc attachment and diffusion in order to reclaim frozen flow losses.

14. The arcjet thruster as recited in claim 13, further comprising:
a third annular-shaped portion of said constrictor being electrically insulative to define another insulator which is disposed side-by-side with said anode, upstream therefrom, and closer to said cathode than is said anode.

* * * * *

UNITED STATES PATENT AND TRADEMARK OFFICE
CERTIFICATE OF CORRECTION

PATENT NO.   : 4,882,465

DATED        : November 21, 1989

INVENTOR(S)  : William W. Smith
               Steven C. Knowles

It is certified that error appears in the above-identified patent and that said Letters Patent is hereby corrected as shown below:

IN THE ABSTRACT:

Line 4, delete "inculator" and insert -- insulator --.

In column 1, line 30, delete "thermalenergy" and insert -- thermal energy --.

In column 1, line 38, replace "H" with -- Heated Thermal Jet --.

In column 2, line 58, delete "an" and insert -- and spaced --.

In column 4, line 17, delete "sunsonic" and insert -- subsonic --.

In column4, line 42, between "the" and "nozzle 24" insert -- subsonic-to-supersonic transition zone of the --.

In column 6, line 3, delete "further in member" and insert -- further includes an elongated member --.

In column 6, line 56, between "upstream" and "70" insert -- insulator --.

Signed and Sealed this

Twenty-fourth Day of September, 1991

Attest:

HARRY F. MANBECK, JR.

Attesting Officer    Commissioner of Patents and Trademarks